(12) United States Patent
Techel et al.

(10) Patent No.: US 7,677,843 B2
(45) Date of Patent: Mar. 16, 2010

(54) CUTTING IMPLEMENT

(75) Inventors: Anja Techel, Gohlis (DE); Joseph Dillon, Athlone (IE)

(73) Assignees: Fraunhofer-Gesellschaft Zur Forderung der Angewandten Forschung E.V., Munich (DE); Lund International, Athlone (IE)

( * ) Notice: Subject to any disclaimer, the term of this patent is extended or adjusted under 35 U.S.C. 154(b) by 94 days.

(21) Appl. No.: 11/801,548

(22) Filed: May 10, 2007

(65) Prior Publication Data

US 2007/0261867 A1    Nov. 15, 2007

(30) Foreign Application Priority Data

May 10, 2006    (IE)    .............................. S2006/0372

(51) Int. Cl.
*B23B 27/00*    (2006.01)
*E02F 3/76*    (2006.01)

(52) U.S. Cl. .......................... 407/119; 407/113; 428/67

(58) Field of Classification Search ......... 407/113–116, 407/119; 428/690, 67, 175, 917
See application file for complete search history.

(56) References Cited

U.S. PATENT DOCUMENTS

| | | | | |
|---|---|---|---|---|
| 2,867,137 A | * | 1/1959 | Joy | 76/115 |
| 3,063,310 A | * | 11/1962 | Connoy | 76/112 |
| 3,125,470 A | * | 3/1964 | Witherell | 75/253 |
| 4,357,817 A | * | 11/1982 | Linsinger | 72/71 |
| 4,428,260 A | | 1/1984 | Eby | |
| 5,329,562 A | * | 7/1994 | Kubo et al. | 376/260 |
| 6,397,651 B2 | * | 6/2002 | Usui et al. | 72/294 |
| 2001/0023607 A1 | * | 9/2001 | Usui et al. | 72/326 |

FOREIGN PATENT DOCUMENTS

| | | |
|---|---|---|
| DE | 8700403 | 5/1987 |
| DE | 8703479.4 | 7/1987 |
| FR | 2868725 | 10/2005 |
| GB | 2264033 | 8/1993 |
| JP | 62181836 | 8/1987 |
| WO | WO2004035242 | 4/2004 |
| WO | WO2007069029 | 6/2007 |

OTHER PUBLICATIONS

European Search Report for Application No. 07006554.5 dated Aug. 28, 2007.
Examination document and Abstract for Application No. 07006554.5.

* cited by examiner

*Primary Examiner*—Will Fridie, Jr.
(74) *Attorney, Agent, or Firm*—Van Dyke, Gardner, Linn & Burkhart, LLP

(57) ABSTRACT

A cutting implement comprises a substrate having a cutting edge, and plurality of hardfacing beads deposited on the substrate transverse to the edge of said substrate.

18 Claims, 1 Drawing Sheet

CUTTING IMPLEMENT

FIELD OF THE INVENTION

The present invention relates generally to a cutting implement, and more particularly to a cutting implement suitable for use with agricultural machines.

BACKGROUND OF THE INVENTION

Many knives or shear bars used in machines designed for agricultural applications such as crop harvesting and animal feed processing have a hardfacing component to protect their cutting edges. The knives or shear bars are hardfaced for a number of reasons such as to provide wear protection, to limit the amount of blunting during service and to extend the service life of the cutting edge.

Agricultural machine knives or shear bars are traditionally hardfaced by thermal spraying of, for example, a nickel based metal powder, which forms a binder matrix containing hard particles such as tungsten carbides, followed by a fusing (sintering) process.

There are limitations to thermal spraying in that it generally uses pre-blended powder alloys with a limited amount of hard particle content. Typically, this limit can be in the region of 50% hard particle content. This is because the spray process requires the binder matrix to retain the hard particles within the hardfacing and, if the percentage of hard particle content gets too large, the hard particle will not be retained on the target substrate.

The agricultural machine industry has overcome this limitation by using build up welding technologies such as Plasma Transferred Arc (PTA) Welding; expensive single stage spraying technologies such as High Velocity Oxy-Fuel (HVOF); or brazing technologies.

PTA, as well as some other processes, generate a large amount of heat, which affects the substrate. So, in the case of sharp knives, PTA would damage a sharp or near sharp machined cutting edge.

Laser surfacing technology also referred to as laser cladding, laser coating, Direct Laser Deposition or laser powder deposition is a process that involves the deposition of hardfacing on a substrate, using a laser heat source to fuse a thin layer of metal to the substrate.

In general, there are two basic techniques for laser cladding. The first is a two-step process where hardfacing material is deposited on a substrate followed by a fusing pass with a laser heat source. The second is a one-stage deposit pass where the additive hardfacing material is deposited into a moving melt pool by a low pressure feed. Laser cladding enables a higher ratio of hard particle to binder alloy in the composition. Nonetheless, laser cladding process can lead to stress cracking in the deposited hardfacing, which can result in a less effective knife or shear bar.

SUMMARY OF THE INVENTION

According to the present invention, there is provided a cutting implement comprising a substrate having a cutting edge, and plurality of hardfacing beads deposited on the substrate transverse to the edge of said substrate.

Optionally, the hardfacing beads are deposited on the substrate at an angle of 90° to the edge of the substrate.

Optionally, said beads are deposited in an overlapping manner.

Optionally, the hardfacing beads are composed of a nickel based alloy blended with any one or more of chromium, tungsten, vanadium and titanium carbide based particles.

Optionally, the substrate further comprises an interface layer having a plurality of interface beads deposited on the surface of the substrate prior to the deposition of said hardfacing beads.

Optionally, the interface beads are deposited parallel to the cutting edge of the substrate.

Optionally, the interface beads are composed of nickel based metallic binder matrix NiBSi.

Optionally, the hardfacing beads are composed of tungsten carbide particles of monophase tungsten with a cobalt coating, WC/Co, or a tungsten melt carbide, WC/W$_2$C combined with a nickel based metallic binder matrix, NiBSi.

Alternatively, the hardfacing beads are composed of sintered and broken titanium carbide, TiC, particles, combined with a nickel based metallic binder matrix, NiBSi.

Alternatively, the hardfacing beads are composed of VCFe combined with a binder matrix 240Cr5MoV10.

Alternatively, the hardfacing beads are composed of molybdenum alloyed titanium carbonitrid powder, (TiMo)(C,N)—NiCo.

Alternatively, the hardfacing beads are composed of molybdenum alloyed titanium carbonitrid powder, (TiMo)(C,N)—NiCo combined with a nickel based metallic binder matrix, NiBSi or a cobalt based metallic binder matrix, CoCrMo.

According to the present invention, there is further provided a method of producing a cutting implement comprising: providing a substrate having surface including a cutting edge and depositing a plurality of hardfacing beads on the surface of the substrate transverse to the cutting edge of the substrate.

Optionally, the hardfacing beads are deposited on the implement by a laser cladding process.

Optionally, the hardfacing beads are deposited in a traversing manner.

Optionally, the substrate comprises a cutting surface adjacent said hardfaced surface, and the method further comprises machining the cutting surface at an angle of between 10 to 45 degrees to provide a serrated cutting edge.

Optionally, the method further comprises, prior to depositing the plurality of hardfacing beads, depositing an interface layer comprising a plurality of interface beads on the surface of the substrate parallel to the cutting edge of the substrate.

Optionally the method further comprises carrying out a deburr grind on said implement.

The present invention provides an implement which is advantageous over an implement where beads of hardfacing material are oriented parallel to the cutting edge, in that the beads provide self-sharpening micro-serrations along the cutting edge of the implement. Thus, if cracking occurs in the hardfacing deposit due to a build up of stress, it is less problematic, and so the invention provides a more effective and durable implement.

These and other objects, advantages, purposes and features of the present invention will become apparent upon review of the following specification in conjunction with the drawings.

DESCRIPTION OF THE PREFERRED EMBODIMENTS

Figure 1:
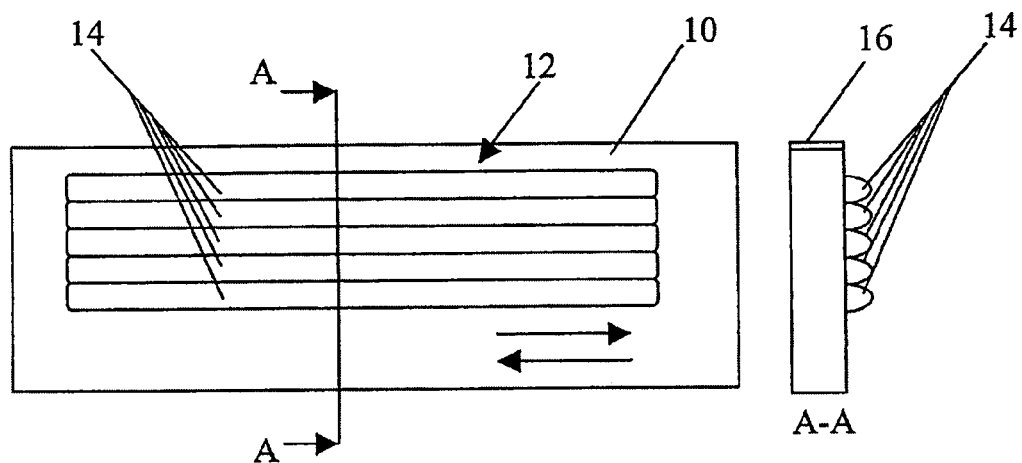
FIG. 1 is a top plan view and a cut-away view of a cutting implement comprising a partially processed substrate having an interface layer component, according to an embodiment of the present invention.

Referring now to FIG. 1, there is shown a substrate 10 to be hardfaced according to the present invention. In some embodiments of the invention, an interface layer 12 of mutually parallel beads 14 of a binding alloy is first deposited on the substrate. In such embodiments, the binding alloy beads are deposited parallel to a cutting edge 16 of the implement. Preferably, the interface layer is composed of a self-fluxing nickel based alloy, examples of which will be given below.

Figure 2:
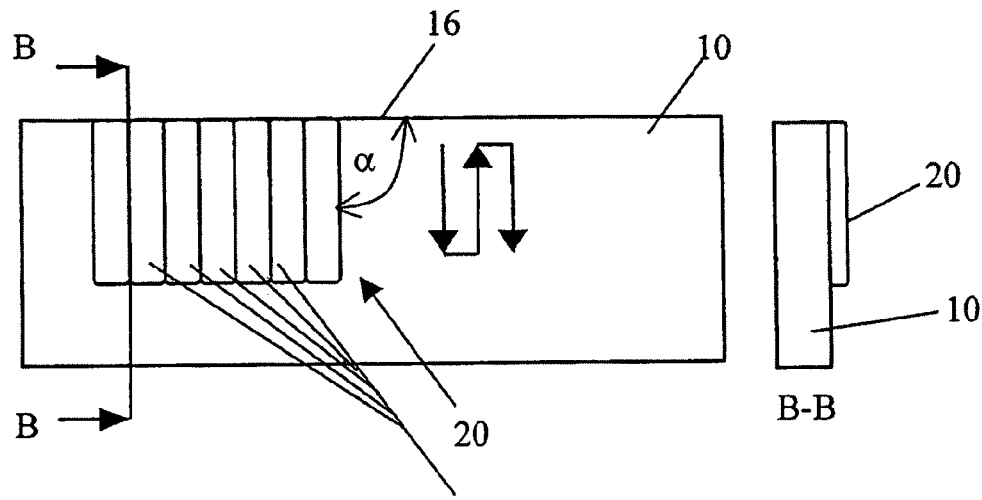
FIG. 2 is a top plan view and cut-away view of a cutting implement comprising a substrate having a final hardfacing component layer, according to an embodiment of the present invention.

Referring now to FIG. 2, an outer layer 20 of hardfacing is deposited on the substrate 10 either over the interface layer 12 or, in the absence of an interface layer, directly on the substrate. The hardfacing layer 20 comprises a binding alloy such as is used in the intermediate layer 12 and abrasive particles comprising, for example, Chromium and/or Tungsten and/or Vanadium and/or Titanium Carbides. However it will be appreciated that the hardfacing layer may comprise any suitable hardfacing alloys.

The hardfacing layer 20 comprises a plurality of mutually parallel beads 22, deposited at approximately 90 degrees to the cutting edge 16 of the substrate 10. It will nonetheless be seen that in variants of the embodiment, the mutually parallel beads 22 can be deposited at an angle α of between 60 and 120 degrees to the edge 16 of the substrate 10.

Optionally, the beads 22 are deposited in an overlapping manner and in the preferred embodiment, the beads overlap by approximately 50%.

Optionally, the hardfacing beads are deposited by applying the hardfacing beads by traversing back and forth across the substrate.

Following an edge grind of the cutting edge 16, the hardfacing implement of FIG. 2 can be used as a shearbar.

In the case where the implement is to be used as a knife, the non-hardfaced surface 24 of the substrate adjacent the cutting edge is machined at an angle β of between 10 and 45 degrees, and preferably, an angle β of 30 degrees.

This has the effect of creating a hardfacing component that once machined has a sharp serrated cutting edge and also that will wear in such a way as to preserve the serrated edge.

In either the case of a shearbar or a knife, a finishing deburr grind can be carried out on the implement.

Figure 3:
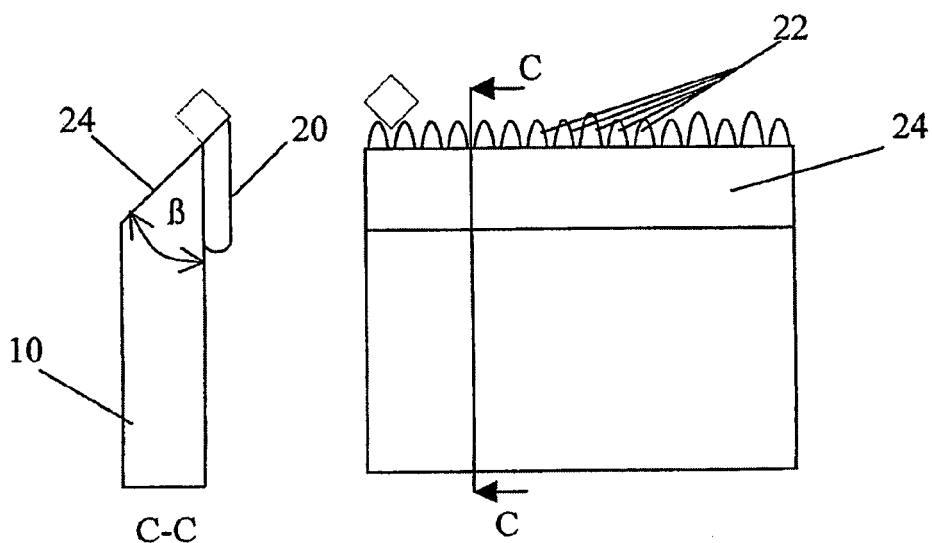
FIG. 3 is a top plan view and cut-away view of the cutting implement of FIG. 2 after machining of the cutting edge.

Optionally, the region of the substrate adjacent the cutting edge is tempered. As the cutting implement of either FIG. 2 or 3, wears in service, the tempered area will wear at a faster rate than the remaining hardfacing material and so retain the serrated edge even when individual beads may partially fail due to stress cracking.

In an embodiment according to the present invention, the hardfacing component 20 is deposited on the substrate 10 by a laser cladding process. Laser cladding is the preferable technology as it has localised heat input, which is required to sinter the hardfacing, whilst at the same time there is little or no deleterious affect on the geometry of the implement. Thus, the laser cladding hardfacing component 20 can be deposited on to a pre-machined implement-edge at the angle α without causing damage to the cutting edge.

Furthermore, laser cladding is preferable as it can be a single stage deposit and fuse process, such as Direct Laser Deposition (DLD), with the possibility for relatively high hard particle (e.g. carbide) content levels. Also, unlike welding, there is very low dilution of the coating and or substrate materials.

The hardfacing component 20 may be supplied by powder injection, wire feeding or paste. In an embodiment, the binder matrix and the abrasive particles comprising the hardfacing component, are fed from respective sources and carried on a stream of inert gas, such as argon, through a coaxial powder nozzle (not shown). The coaxial nozzle facilitates mixing of hard particles, channeled through a first aperture, and a binder alloy channeled through a second aperture, to produce the hardfacing used for cladding the substrate. It will be seen that for depositing the interface layer 12, only the binder alloy needs to be supplied.

In an embodiment, the laser and nozzle are traversed with respect to the substrate in order to apply the hardfacing to the substrate. However, it will be appreciated that in an alternative embodiment, the laser and nozzle remain stationary, while the substrate is traversed.

While in an embodiment, the power is blended at the intersection of the powder streams with the laser beam, it will be seen that the powder may also be pre-blended, and so a binder alloy only source would need to be available for forming the interface layer.

The powder nozzle is focussed so as to be co-incident with a "defocused" laser beam (not shown), such that the beam can melt the powder and fuse it to the substrate. The powder nozzle is displaced approximately in the range 13 mm to 31 mm from the substrate and has a minimum focus of about 1 mm. The laser spot on the substrate is approximately in the range 1.6 mm to 5 mm.

Characteristics of the serrated cutting edge of the implement such as pitch, waveform, and angle are generated as a result of the laser cladding process variables. The laser cladding process variables comprise deposit angle, deposit bead overlap, bead width, and thickness of the deposit, spot diameter, power/intensity of laser beam, and hardfacing quantity and these are set-out in more detail in relation to the specific examples described below:

Example 1

In this example, an interface layer of nickel based metallic binder matrix (NiBSi) such as Deloro PW was deposited in a traversing manner parallel to the edge of the substrate to produce a crack free layer of approximately 1 mm in thickness on the substrate. A hardfacing component comprising tungsten carbide (WC/Co) particles of monophase tungsten with a cobalt coating at the rate of 88:12, such as Ampereit 522.2, HCStarck, combined with NiBSi was deposited in a traversing manner with a thickness of approximately 1 mm at an angle of approximately α=90° to the edge of the substrate. However, it will be appreciated that the WC/Co particles of the hardfacing component may be replaced with tungsten melt carbide, $WC/W_2C$. The size of the WC/Co particles was approximately in the range 45 to 90 μm, a typical hard phase particle size range for hard facing blends. The process parameters for this example are set out in Table 1(a) below:

TABLE 1

| Interface Layer: NiBSi | Laser Power | 2000 W |
|---|---|---|
| | Spot size | 5 mm |
| | Deposit Velocity | 800 mm/min |
| | Powder feed | 13 g/min |

TABLE 1-continued

| | | |
|---|---|---|
| | Bead pitch | 2.5 mm/layer |
| | Supply stream | Argon |
| | #beads | 13 |
| Hardfacing Component Layer: NiBSi + WC/Co 50:50 | Laser Power | 2000 W |
| | Spot size | 5 mm |
| | Deposit Velocity | 300 mm/min |
| | Powder Feed | |
| | NiBSi | 6.5 g/min |
| | WC/Co | 10.8 g/min |
| | Bead pitch | 2.5 mm/layer |
| | Supply stream | Argon |
| | #beads | 72 |

The result of this process was a hardfacing component with no pores. An analysis of the hardfacing layer showed a hard particle content of about 40% in the overlapping areas and about 63% inside the non-overlapping areas. The tungsten carbide particles remain nearly non-dissolved after the welding process.

Example 2

In this example, the beads of the hardfacing layer were deposited in a meandering pattern using the following process parameters:

TABLE 2

| | | |
|---|---|---|
| Interface Layer: NiBSi | Laser Power | 1500 W |
| | Spot size | 5 mm |
| | Deposit Velocity | 800 mm/min |
| | Powder feed | 9 g/min |
| | Bead pitch | 2.5 mm/layer |
| | Supply stream | Argon |
| | #beads | 5 |
| Hardfacing Component Layer: NiBSi + WC/Co 50:50 | Laser Power | 1500 W |
| | Spot size | 5 mm |
| | Deposit Velocity | 300 mm/min |
| | Powder Feed | |
| | NiBSi | 4 g/min |
| | WC/Co | 6 g/min |
| | Bead pitch | 2.5 mm/layer |
| | Supply stream | Argon meander |

In this case, crack free layers were also produced.

Example 3

In this example, an interface layer of NiBSi was deposited in a traversing manner parallel to the edge of the substrate to produce a crack free layer of approximately 1 mm in thickness on the substrate. A hardfacing component comprising sintered and broken titanium carbide (TiC) particles, available from HCStarck, combined with NiBSi was deposited in a traversing manner with a thickness of approximately 1 mm at an angle of approximately α=90° to the edge of the substrate. The process parameters for this example are set out in Table 2(a) below:

TABLE 3

| | | |
|---|---|---|
| Interface Layer: NiBSi | Laser Power | 2000 W |
| | Spot size | 5 mm |
| | Deposit Velocity | 800 mm/min |
| | Powder feed | 13 g/min |
| | Bead pitch | 2.5 mm/layer |
| | Supply stream | Argon |
| | #beads | 13 |
| Hardfacing Component Layer: NiBSi + TiC 40:60 | Laser Power | 2500 W |
| | Spot size | 5 mm |
| | Deposit Velocity | 400 mm/min |
| | Powder Feed | |
| | NiBSi | 5 g/min |
| | TiC | 4.5 g/min |
| | Bead pitch | 2.4 mm/layer |
| | Supply stream | Argon |
| | #beads | 72 |

The cutting edge produced was less wavy than that of example 1 and only some pores were found. In the interface layer, the hard particle content was smaller than inside the hardfacing layer. An analysis showed a hard particle content of about 38% in the overlapping areas, and 64% in the non-overlapping areas. Many TiC-particles with a particle size of about 50 μm and also a high number of small TiC particles were found in the hardfacing layer.

Example 4

In this example, the beads of the hardfacing layer were deposited in a meandering pattern using the following process parameters:

TABLE 4

| | | |
|---|---|---|
| Interface Layer: NiBSi | Laser Power | 1500 W |
| | Spot size | 5 mm |
| | Deposit Velocity | 800 mm/min |
| | Powder feed | 9 g/min |
| | Bead pitch | 2.5 mm/layer |
| | Supply stream | Argon |
| | #beads | 5 |
| Hardfacing Component Layer: NiBSi + TiC 40:60 | Laser Power | 2500 W |
| | Spot size | 5 mm |
| | Deposit Velocity | 400 mm/min |
| | Powder Feed | |
| | NiBSi | 5 g/min |
| | TiC | 5 g/min |
| | Bead pitch | 2.4 mm/layer |
| | Supply stream | Argon Meander |

Again, crack free layers were produced.

Example 5

In this example, no interface layer was employed. The binder matrix material comprised 240Cr5MoV10 (Anval Micro Melt A11), a high speed steel powder with contents of 2.2-2.4% carbon, 0.9% silicon, 0.8% manganese, 10% vanadium and other carbon builders such as chromium (4.5%) and molybdenum (1.3%). This was mixed with VC-Fe powder. The size of the 240Cr5MoV10 particles was approximately in the range 53 to 177 μm. The 240Cr5MoV10 powder provides a martensitic steel matrix with fine grained vanadium, chromium and molybdenum precipitations after laser cladding. The VC particles were agglomerated and sintered together with 12% pure iron to produce a composite powder having particle size approximately in the range 45 to 90 μm with fine-grained VC particles approximately 5 μm in size.

The 240Cr5MoV10+VC-Fe was deposited in a traversing manner with a thickness of approximately 1 mm at an angle of approximately α=90° to the edge of the substrate.

The process parameters for this example are set out in Table 3 below

TABLE 5

| Hardfacing Component Layer: 240Cr5MoV10 + VC/Fe 60:40 | Laser Power | 1500 W |
|---|---|---|
| | Spot size | 3 mm |
| | Deposit Velocity | 500 mm/min |
| | Powder Feed | |
| | 240Cr5MoV10 | 3.2 g/min |
| | VC/Fe | 3.1 g/min |
| | Bead pitch | 1.4 mm/layer |
| | Supply stream | Argon |
| | #beads | 72 |

Laser cladding of VC-Fe with high-speed steel powder 240Cr5MoV10 produced fine-grained carbide precipitations in a hard martensitic steel matrix. Again an analysis showed no pores and the hard particle content in the overlapping area and inside the non-overlapping areas is nearly the same. The vanadium carbide particles in the layer were smaller than 5 μm and evenly distributed.

Example 6

In this example, the hardfacing component comprised molybdenum alloyed titanium carbonitrid powder, (TiMo)(C,N)-28Co (S47) which was produced by agglomerating and sintering fine grained titanium carbide particles, having a size of about 3 μm with a cobalt binder. It will be appreciated, however, that the (TiMo)(C,N)-28Co may be replaced by (TiMo)(C,N)—NiCo. The proportion of the binder was 28.4 mass percent and the proportion of hard material was defined by 59.3% $TiC_{0.7}N_{0.3}$ and 12.3% $Mo_2C$. The presence of molybdenum in the hard material phase improves wetting with the metallic matrix and the presence of nitrogen introduces superfine hard particles. The size of the particles of the (TiMo)(C,N)-28Co were approximately in the range 40 to 90 μm. In order to improve process ability, small proportions of NiBSi with a particle size approximately in the range of 45 to 90 μm were added to the (TiMo)(C,N)-28Co. However it will be appreciated that the NiBSi added to the (TiMo)(C,N)-28Co may be replaced with cobalt based metallic binder matrix, CoCrMo. The hardfacing component was deposited in a traversing manner with a thickness of approximately 0.3 mm at an angle of approximately α=90° to the edge of the substrate. The process parameters for this example are set out in Table 4(a) below:

TABLE 6

| Hardfacing Component Layer: (TiMo)(C,N)—28Co + NiBSi 75:25 | Laser Power | 1900 W |
|---|---|---|
| | Spot size | 5 mm |
| | Deposit Velocity | 400 mm/min |
| | Powder Feed | |
| | NiBSi | 1.6 g/min |
| | (TiMo)(C,N)—28Co | 2.5 g/min |

TABLE 6-continued

| | Bead pitch | 2.5 mm/layer |
|---|---|---|
| | Supply stream | Argon |
| | #beads | 72 |

Initially the resulting surface of the hardfacing component on the substrate is quite rippled. However, as the substrate became warmer during processing, the deposited layer became smoother. The bead width is about 5 mm, with the overlapping area being about 50%. An analysis showed a smaller hard particle content in the overlapping areas than in the non-overlapping areas. An analysis of a non-overlapping area shows a hard particle content of about 44%.

Example 7

In this example, except that no NiBSi was added to the (TiMo)(C,N)-28Co for the hardfacing, particles as in Example 6 are used. In order to achieve a hardfacing component with a thickness of approximately 1 mm, an interface layer of NiBSi was deposited in a traversing manner parallel to the edge of the substrate to produce crack free layers on the substrate. The process parameters for this case are set out in Table 4(b) below:

TABLE 7

| Interface Layer: NiBSi | Laser Power | 2000 W |
|---|---|---|
| | Spot size | 5 mm |
| | Deposit Velocity | 800 mm/min |
| | Powder feed | 13 g/min |
| | Bead pitch | 2.5 mm/layer |
| | Supply stream | Argon |
| | #layers | 13 layers |
| Hardfacing Component Layer: (TiMo)(C,N)—28Co Hardness: 475 HV0.3 in the middle | Laser Power | 2500 W |
| | Spot size | 5 mm |
| | Deposit Velocity | 400 mm/min |
| | Powder Feed | |
| | (TiMo)(C,N)—28Co | 6.6 g/min |
| | Bead pitch | 2.5 mm/layer |
| | Supply stream | Argon |
| | #layers | 72 |

In the interface layer some small pores were found. Hard particle rich areas of the hardfacing layer showed hard particle content of about 37%. In the overlapping area the hard particle content was lower.

Laser cladding of molybdenum alloyed titanium carbonitrid compound powder with cobalt binder and Deloro PW yields fine-grained carbide precipitations in a ductile nickel based matrix.

The combination of tungsten or titanium carbide and Deloro WC produces a hardfacing structure of coarse-grained hard particles in a ductile matrix. However it will be appreciated that any suitable binder matrix may be employed.

It will be appreciated that an implement comprising a serrated cutting edge as provided in the above examples is suitable for implementation in agricultural machinery, for example, forage harvester knives, vertical auger feed mixer wagon knives, horizontal feed mixer wagon knives, sickle sections, stalk chopper knives for maize head attachment, combine harvester straw chopper knives.

Apart from the agricultural applications the cutting implement is also suitable for use in many other applications such as knives for food preparation, process and textiles.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A shearing implement, comprising:
a substrate having a first side forming a major surface, a second side an angled with respect to the first side, and a longitudinal edge formed at the juncture of the first side and the second side extending along the first side of the substrate; and
a plurality of hardfacing beads deposited on said major surface of said substrate, the beads having a length extending transverse to the longitudinal edge of said substrate at an angle in a range of 60° to 120° relative to the longitudinal edge to produce a hardened serrated cutting edge along the longitudinal edge.

2. The shearing implement according to claim 1, wherein said hardfacing beads are deposited on the substrate at an angle of 90° to the longitudinal edge of the substrate.

3. The shearing implement according to claim 1, wherein said substrate further comprises an interface layer having a plurality of interface beads deposited on the surface of the substrate before said hard racing beads are deposited on the substrate.

4. The shearing implement according to claim 3, wherein said interface beads are deposited parallel to the longitudinal edge of the substrate.

5. The shearing implement according to claim 3, wherein said interface beads are composed of nickel-based metallic binder matrix NiBSi.

6. The shearing implement according to claim 1, wherein said hardfacing beads are composed of tungsten carbide particles of monophase tungsten with a cobalt coating, WC/Co, or a tungsten melt carbide, WC/W$_2$C combined with a nickel based metallic binder matrix, NiBSi.

7. The shearing implement according to claim 1, wherein said hardfacing beads are composed of sintered and broken titanium carbide, TiC, particles, combined with a nickel based metallic binder matrix, NiBSi.

8. The shearing implement according to claim 1, wherein said hardfacing beads are composed of VCFe combined with a binder matrix 240Cr5MoV10.

9. The shearing implement according to claim 1, wherein said hardfacing beads are composed of molybdenum alloyed titanium carbonitrid powder, (TiMo)(C,N)—NiCo.

10. The shearing implement according to claim 1, wherein said hardfacing beads are composed of molybdenum alloyed titanium carbonitrid powder, (TiMo)(C,N)—NiCo combined with a nickel based metallic binder matrix, NiBSi or a cobalt based metallic binder matrix, CoCrMo.

11. A method of producing a shearing implement, comprising:
providing a substrate having a first side forming a major surface, a second side angled with respect to the first side, and a longitudinal edge formed at the juncture of the first side and the second side; and
depositing a plurality of hardfacing beads on the major surface of the substrate running transverse to the longitudinal edge of the substrate at an angle in a range of 60° to 120° relative to the longitudinal edge to produce a hardened serrated cutting edge along the longitudinal edge.

12. The method of dam 11 wherein said hardfacing beads are deposited on said implement by a laser cladding process.

13. The method of claim 11 wherein said hardfacing beads are deposited in a traversing manner.

14. The method of claim 11, further comprising machining the second side at an angle of between 10 to 45 degrees to provide said serrated cutting edge.

15. The method of claim 11, further comprising depositing an interface layer comprising a plurality of interface beads on the surface of the substrate parallel to the longitudinal edge of the substrate, prior to depositing said plurality of hardfacing beads.

16. The method of claim 11 further comprising carrying out a deburr grind on said implement.

17. A shearing implement comprising:
a substrate having a first side forming a major surface, a second side angled with respect to the first side, and a longitudinal edge formed at the juncture of the first side and the second side;
a plurality of hardfacing beads deposited on the major surface of the substrate running transverse to the longitudinal edge of said substrate at an angle in a range of 60° to 120° relative to said longitudinal edge; and
an interface layer having a plurality of interface beads deposited on the major surface of the substrate prior to the deposition of said hardfacing beads.

18. A method of producing a shearing implement comprising:
providing a substrate having a first side forming a major surface, a second side angled with respect to the first side, and a longitudinal edge formed at the juncture of the first side and the second side;
depositing a plurality of hardfacing beads on the major surface of the substrate running transverse to flit longitudinal edge of the substrate at an angle in a range of 60° to 120° relative to the longitudinal edge; and
prior to the deposition of said hardfacing beads, depositing an interface layer having a plurality of interface beads on the major surface of the substrate.

* * * * *

UNITED STATES PATENT AND TRADEMARK OFFICE
CERTIFICATE OF CORRECTION

PATENT NO.        : 7,677,843 B2                                               Page 1 of 1
APPLICATION NO.   : 11/801548
DATED             : March 16, 2010
INVENTOR(S)       : Techel et al.

It is certified that error appears in the above-identified patent and that said Letters Patent is hereby corrected as shown below:

On the Title Page
Item (73) Assignees:

"Fraunhofer-Gesellsschaft Zur Forderung der Angewandten Forschung E.V., Munich (DE); Lund International, Athlone (IE)"

should be

--Fraunhofer-Gesellsschaft Zur Forderung der Angewandten Forschung E.V., Munich (DE); Lund Precision Products Limited, Athlone (IE)--

Column 9
Claim 1, Line 10, "an angled" should be --angled--
Claim 3, Line 26, "hard racing" should be --hardfacing--

Column 10
Claim 12, Line 13, "dam" should be --claim--

Signed and Sealed this
Twenty-second Day of February, 2011

David J. Kappos
*Director of the United States Patent and Trademark Office*